United States Patent [19]

Kyriakodis

[11] 4,093,282
[45] June 6, 1978

[54] HOSE CLAMP

[76] Inventor: George H. Kyriakodis, 1944 King Arthur Rd., Philadelphia, Pa. 19116

[21] Appl. No.: 744,502

[22] Filed: Nov. 24, 1976

[51] Int. Cl.² .................................................. F16L 35/00
[52] U.S. Cl. ...................................... 285/114; 285/253; 285/259
[58] Field of Search ............... 285/253, 252, 259, 114, 285/115, 116, 242, 243, 8; 403/346, 347, 207; 24/81 PE

[56] References Cited

U.S. PATENT DOCUMENTS

| | | | |
|---|---|---|---|
| 366,532 | 7/1887 | Tuerk | 285/253 X |
| 393,400 | 11/1888 | Sharpneck | 285/253 X |
| 1,212,817 | 1/1917 | Russell | 285/253 X |
| 1,346,330 | 7/1920 | Mitchell | 285/253 X |
| 1,426,086 | 8/1922 | Lowrey | 285/253 X |
| 1,477,573 | 12/1923 | Lowrey | 285/259 X |
| 1,539,001 | 5/1925 | Steeple | 285/253 |
| 2,403,449 | 7/1946 | Meyer et al. | 285/367 X |
| 2,958,549 | 11/1960 | Spafford | 285/243 |
| 2,963,305 | 12/1960 | Miller | 285/114 |
| 3,174,777 | 3/1965 | Lodholm et al. | 285/252 |
| 3,407,448 | 10/1968 | Tetzlaff et al. | 285/253 X |

Primary Examiner—Dave W. Arola
Attorney, Agent, or Firm—Edelson and Udell

[57] ABSTRACT

A hose clamp utilizing two constricting band type hose clamps which are tied together by means of a strapping arrangement includes one clamp which surrounds the hose itself and is provided with protuberances which press into the outer surface of the hose to provide a strong gripping function which prevents the hose from moving with respect to this clamp while at the same time engaging the hose in a non-destructive manner. The hose if not grippingly interengaged with the clamp would under pressure slide out of the clamp and off of the fitting. A second hose clamp is clamped about the rigid fitting to which the hose is attached at a point beyond an enlargement in the fitting, so that this clamp cannot move past the fitting enlargement. The straps connecting the two clamps then prevent the hose from sliding off of the rigid fitting because of the restraint provided by the clamp which is secured beyond the fitting enlargement. Two forms of clamp are disclosed, one form having connecting straps and hose engaging protuberances integral with one of the clamps, and a second form in which the hose engaging protuberances are integral with the connecting straps which are physically separate from the clamps.

2 Claims, 5 Drawing Figures

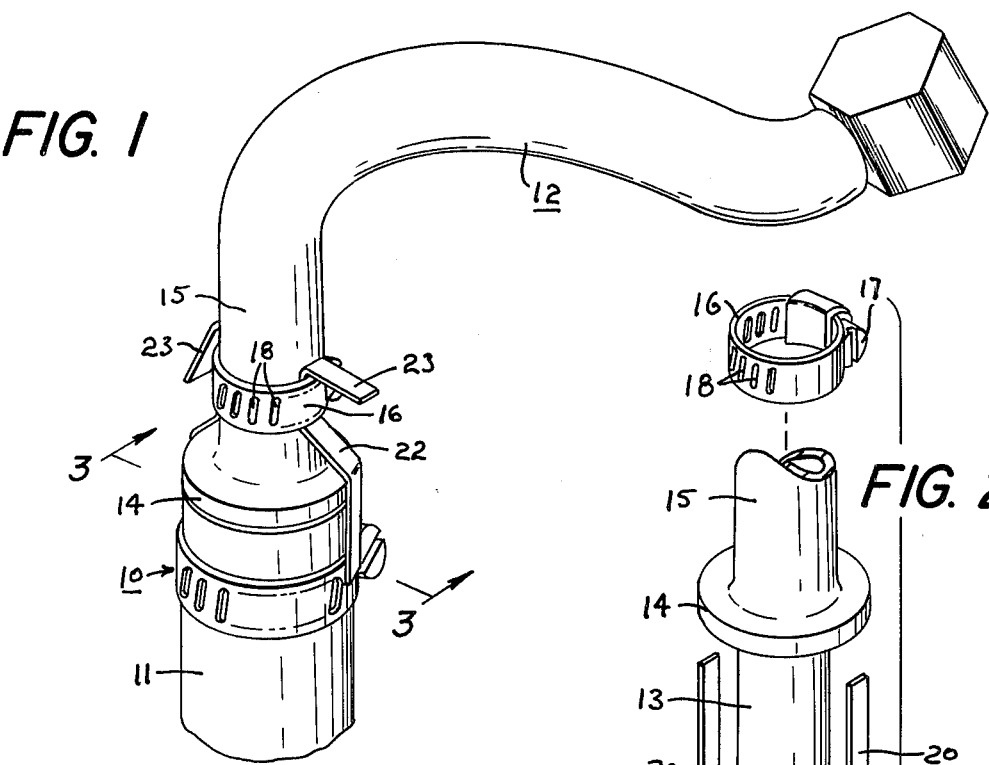
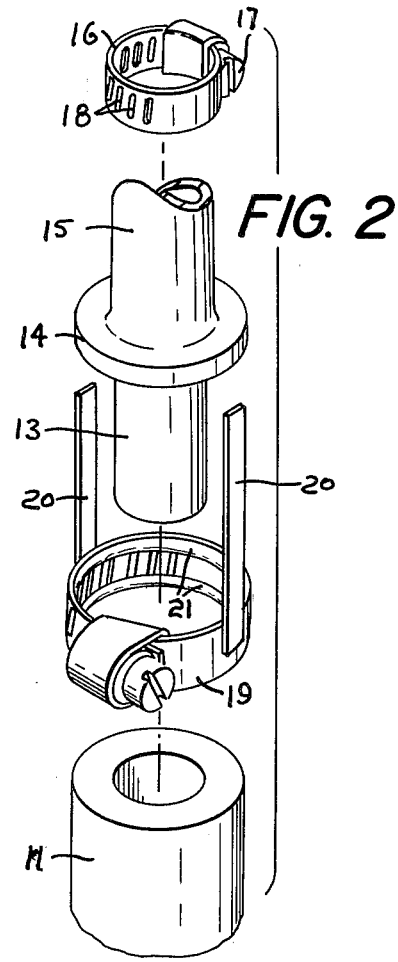
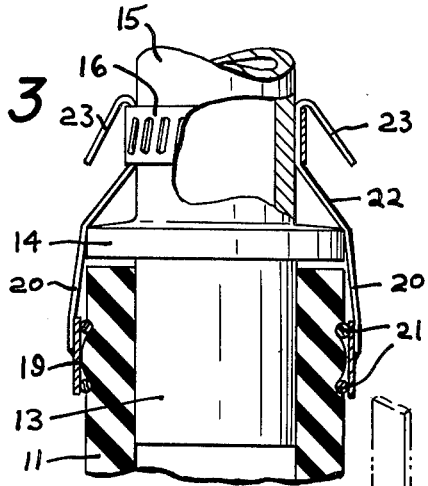
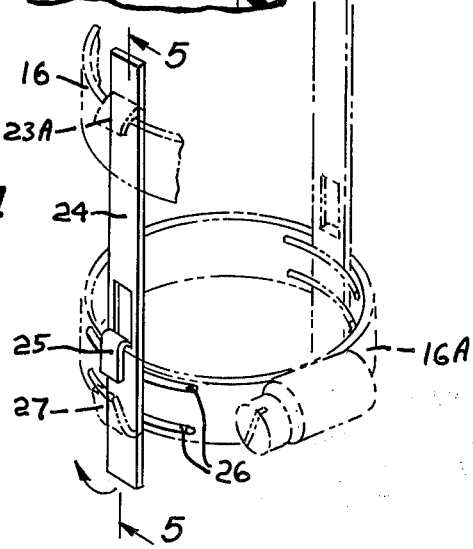
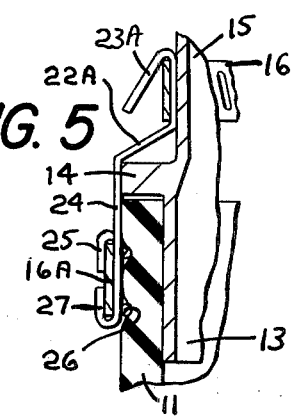

HOSE CLAMP

This invention relates generally to hose clamps, and more particularly relates to hose clamps used as replacements in high pressure flexible hose systems.

Many high pressure hose systems, as for example automobile air conditioning hose systems, have specialized integrally attached metal or plastic end fittings on the hoses which interfit with and lock to the rigid fittings to which the hoses connect. When a leak develops in the hose itself it becomes very expensive to replace the hose because a hose must be obtained which includes the integrally attached very specialized fittings which are required. By utilizing the hose clamp according to the invention it is possible to dispense with the use of expensive replacement parts and to use standard high pressure rubber hose together with the old rigid fittings.

In the past, high pressure hose clamping devices have been devised, but these devices have themselves constituted complicated and expensive clamping structures. The hose clamp according to the invention basically consists of the use of two constricting band type hose clamps which are tied together by means of a strapping arrangement. One clamp, which surrounds the hose itself is provided with means which press into the outer surface of the hose to provide a strong gripping function which prevents the hose from moving with respect to this clamp while at the same time engaging the hose in a non-destructive manner. The hose if not grippingly interengaged with the clamp would under pressure slide out of the clamp and off of the fitting.

The other hose clamp is clamped about the rigid fitting to which the hose is attached at a point beyond an enlargement in the fitting, so that this clamp cannot move past the fitting enlargement. The metal straps connecting the two clamps then prevent the hose from sliding off of the rigid fitting because of the restraint provided by the clamp which is secured beyond the enlargement on the fitting. Accordingly, it is a primary object of the invention to provide a novel hose clamp which prevents high pressure hoses from being disengaged from the fittings to which they are clamped due to the pressures in the system.

It is another object of the invention to provide a novel hose clamp structure which in one form uses a standard constricting band hose clamp together with a second constricting band hose clamp having adjustable length arms extending therefrom and hose engaging protuberances which prevent movement of the hose with respect to the clamp.

A further object of the invention is to provide a novel hose clamp apparatus as aforesaid which utilizes a pair of standard constricting band hose clamps together with a pair of separate attachment arms secured to one of the constricting band clamps, the attachment arms themselves carrying hose engaging protuberances which lock the clamp to the hose.

Yet another object of the invention is to provide a novel hose clamp as aforesaid in which the hose engaging protuberances do not cut into or otherwise rupture the surface of the hose to which the clamp is secured.

The foregoing and other objects of the invention will become clear from a reading of the following specification in conjunction with an examination of the appended drawing, wherein:

FIG. 1 is an isometric view of one form of hose clamp according to the invention showing the hose clamp in its installed and locked-up condition;

FIG. 2 is an exploded isometric view of the hose clamp embodiment seen in FIG. 1 with various parts separated for clarity of viewing and understanding;

FIG. 3 is a longitudinal central section through the hose clamp structure of FIG. 1 as would be seen when viewed along the line 3—3 of FIG. 1;

FIG. 4 is a second embodiment of the hose clamp apparatus according to the invention, with the constricting band hose clamps shown in dashed line and with the locking strap elements shown in solid line; and FIG. 5 is a longitudinal cross-sectional view as would be seen along line 5—5 of FIG. 4 with the apparatus of FIG. 4 installed on the hose and pipe structure of FIG. 3.

In the several figures, like elements are denoted by like reference characters.

Referring now to the drawings, FIGS. 1 and 2 show an assembly in which one form of the hose clamp according to the invention, designated generally as 10, clamps a high pressure hose 11 to a modified rigid fitting 12. The rigid fitting 12 has a small diameter tubular portion 13 of smooth outer surface onto which the hose 11 is slipped until it abuts against the flange or shoulder 14, the fitting again reducing in diameter beyond the flange 14 to a second tubular portion 15.

The fitting 12 would in practice be a special fitting which would be part of a hose and fitting set that normally would have to be purchased together as a replacement unit in the event of a ruptured hose, the cost of such sets varying in price upwards to the order of perhaps 60 or 70 dollars. The special fitting would normally have a specially formed part extending coaxially from the shoulder 14 and radially outwardly of the tubular portion 13, and this specially formed part would normally interlock with a special rigid end fitting secured on the end of the high pressure hose. As shown in the drawing, the specially formed part extending from the shoulder 14 of the old fitting 12 has been removed, as for example by sawing and filing smooth. Since the tubular portion 13 of the fitting 12 is smooth surfaced, it is not possible to retain a standard hose thereon in a high pressure system by merely clamping the hose with a conventional hose clamp. Accordingly, a specialized clamp is required, and such is provided by the clamp according to the invention.

The hose clamp 10 according to the invention is observed to include an upper constricting band hose clamp 16 of the standard type in which the band is reduced and enlarged in diameter by the action of the threads of a captive screw 17 cooperating with the slots 18 in the clamp band. The lower constricting band hose clamp 19 is a modified form of the clamp 16, the modifications consisting of the welding or otherwise securing to diametrically opposite outer surfaces of the constricting band a pair of elongated parallel extending locking arms 20, and the forming on the inner circular surfaces of the constricting band of a pair of inwardly radially extending protuberances 21, the ring protuberances 21 being formed by molding, stamping or the welding on of wire sections.

The hose and clamp assembly is assembled by disposing the upper hose clamp 16 about the tubular portion 15 of the fitting 12, slipping the lower clamp 19 over the end of the high pressure hose 11, and then slipping the hose 11 onto the tubular portion 13 of the fitting 12. The clamp 19 is then positioned so that it will, upon being tightened, clamp the hose 11 inward against the tubular portion 13 of the fitting 12 as seen in FIG. 3, and the clamp 19 is then tightened about the hose 11 so that the ring protuberances 21 press inward below the surface of the hose 11 to clamp the hose securely about the tubular portion 13 of the fitting 12.

The locking arms 20 of the lower clamp 19 are then slipped between the inside of upper hose clamp band 16 and the tubular portion 15 of the fitting 12, the locking arms are depressed inward over the flange 14 of the fitting 12, as seen in FIGS. 1 and 3, and upper hose clamp 16 is forced downward until further movement is restrained by the inwardly sloped portions 22 of the locking arms 20. The upper clamping band 16 is then constricted tightly about the tubular portion 15 of the fitting 12, and the ends 23 of the locking arms 20 are turned downward about the upper edge of the band of upper hose clamp 16 to complete the assembly.

When the system is put under pressure, the tendency of the hose 11 to slip downward off of the smooth tubular portion 13 of the fitting 12 is prevented by the fact that the hose 11 is locked to the lower clamp 19 by means of the ring protuberances 21 so that the hose cannot move relatively to the clamping band 19, and the clamping band 19 cannot move because it is locked to the upper clamping band 16 which cannot move downward past the flange 14.

Another embodiment of the invention is shown in FIGS. 4 and 5 to which attention should be now directed. In this form of the invention, a pair of standard constricting band hose clamps 16 and 16A are employed, both the upper and lower clamps 16 and 16A being the same as the clamp 16 illustrated in the embodiment of FIGS. 1, 2 and 3, except perhaps for size. The two standard constricting band hose clamps 16 and 16A are utilized in conjunction with a pair of separate elongated straps 24 each of which has struck out and turned down from a portion of the strap a hook tab 25, and to the inside surface of which strap 24 are transversely welded or otherwise secured to the strap a pair of ring segments 26. The straps 24 are physically secured to the lower hose clamp 16A by placing the straps as shown in FIG. 4 against the inside surface of the hose clamp band with the hook tab 25 hooked over the upper edge of the constricting band and extending downward along the outside surface thereof. The lower end of the formed straps 24 which extend below the lower edge of the band of clamp 16A are turned outwardly and upwardly about the constricting band to form locking end tabs 27 which lock the entire strap 24 to the lower hose clamp 16A, the straps 24 being positioned at diametrically opposite points across the constricting band 16A.

With the straps 24 so secured, the ring segments 26 are disposed radially inwardly of the inside surface of the constricting band of clamp 16A so that these ring segments will engage the outer surface of the high pressure hose 11 as shown in FIG. 5 when the hose clamp 16A is tightened about the hose 11 in the same manner as has already been described in connection with the showing of FIG. 3. The upper ends of the straps 24 are secured to the upper hose clamp 16 in exactly the same manner as has previously been described in connection with the showing of FIGS. 1, 2 and 3. That is, the upper clamp 16 is moved downward until it engages the inwardly sloped portions 22A, and the upper ends 23A of the straps 24 are then turned downward about the upper hose clamp 16 after the latter has been tightened inward against the tubular portion 15 of the fitting 12.

The embodiment of FIGS. 4 and 5 permits the use of standard constricting band hose clamps, which are staple items of commerce, together with the addition of a simple formed strap 24 to effect a very inexpensive and quickly assembled hose clamp structure which is completely effective in preventing separation of hoses from fittings in high pressure systems. The hose clamps and the strap assemblies 24 may be formed of metal or plastic as desired. Alternatively, the straps 24 could be of flexible fiber or plastic with extended opposite ends turned back and secured to one another.

It will also be understood that two hoses can be clamped together by the clamp according to the invention, and this is best accomplished by use of a double ended fitting such as one including the tubular portion 13 and flange 14 of the rigid fitting 12 with another tubular portion 13 in place of the tubular portion 15. A straight nipple could also be used.

Having now described my invention in connection with a particularly illustrated embodiment thereof, variations and modifications of the invention may now occur from time to time to those persons normally skilled in the art without departing from the essential scope or spirit of the invention, and accordingly it is intended to claim the same broadly as well as specifically as indicated by the appended claims.

What is claimed to be new and useful is:

1. A hose clamp adapter strap for use in conjunction with a pair of constricting band hose clamps wherein a first such clamp is clampingly disposable about a resilient hose to clamp such a hose about a rigid fitting, and wherein a second such clamp is clampingly disposable about another portion of the aforesaid rigid fitting, said adapter strap comprising in combination, (a) an elongated strap made of semi-rigid deformable material having first and second strap ends, said strap being rigidly lockable at said first end to said first clamp, and being adjustably rigidly securable at said second end to said second clamp and being effective when so secured to prevent said clamps from moving away from one another, the adjustable rigid securement of said strap second end to said second clamp being effected by passing said strap second end between the constricting band hose clamp and the underlying surface of said rigid fitting and then reversely turning said strap second end outward away from the fitting and backward over the constricting band clamp and an intermediate portion of said strap, (b) a tab extending toward said first strap end from an intermediate point along the length of the strap, the rigid lock of said strap to said first clamp being effected by capturing the clamp between the strap and the said tab with the strap disposed against the inside surface of the clamp and with the tab disposed against the outside surface of the clamp, and then turning the said first strap end outward around the clamp and reversely to overlie the outer surface of the clamp and align with the said tab, and (c) hose surface deforming protuberances carried by said elongated strap in hose surface engaging position and effective to deform such hose surface radially inwardly in limited surface areas when said first clamp is clamped about the hose to thereby effectively lock the hose to said first clamp.

2. A hose clamp adapter strap as defined in claim 1 wherein said protuberances are generally in the form of circular arcs disposed in planes transverse to the flow axis of the hose to be clamped, the concave surface of said circular arc protuberances facing the direction away from the said strap tab, and said protuberances being of greater lengthwise extent than the strap width.

* * * * *